March 3, 1959 M. FOLTZER ET AL 2,875,785

VALVE ARRANGEMENT FOR PRESSURE-FLUID PIPE SYSTEMS

Filed Jan. 4, 1956 5 Sheets-Sheet 2

United States Patent Office 2,875,785
Patented Mar. 3, 1959

2,875,785

VALVE ARRANGEMENT FOR PRESSURE-FLUID PIPE SYSTEMS

Marcel Foltzer, Hegenheim, and Willy Wagner, Mulhouse, France

Application January 4, 1956, Serial No. 557,380

Claims priority, application France January 7, 1955

3 Claims. (Cl. 137—629)

This invention relates to valves and particularly to gate or like valves adapted to be mounted in pipe systems for controlling fluids under pressure or load.

Valves of this type are already known which comprise a main valve member and an auxiliary valve member for discharging the main valve member from the fluid pressure when the valve is opened or closed.

A known design consists in mounting the two movable valve members on a common slide-face, each valve member controlling a passage for the pressure fluid through the pipe body, both valve members being hingedly interconnected through members so arranged that when the main valve member is opened and closed the auxiliary valve member is also actuated to facilitate the operation of the main valve member.

Another known design consists in mounting the discharge valve member on the main valve member.

Now it is the object of this invention to provide an improved valve construction of the aforesaid type, which is characterized by greatly simplified design and control, in combination with reduced over-all dimensions both of the valve members and of their connecting members.

According to this invention the body of the closing device is provided with a cylindrical chamber connected on the one side to the inlet pipe receiving the oncoming or pressure fluid and on the other side to the exhaust or discharge pipe, an auxiliary chamber having smaller dimensions than, and mounted on the periphery of, said cylindrical chamber so as to communicate therewith, a shaft connected to the valve control member and rigid with means adapted to connect said auxiliary chamber with the fluid pipes and at the same time to control through a linkage system the operation of said main valve member whereby the auxiliary chamber becomes operative before the main valve member is opened or closed.

Reference will now be made to the attached drawings forming part of this specification and showing diagrammatically by way of example a possible embodiment of a valve device mounted in the exhaust pipe of an engine. In the drawings.

Figure 1:
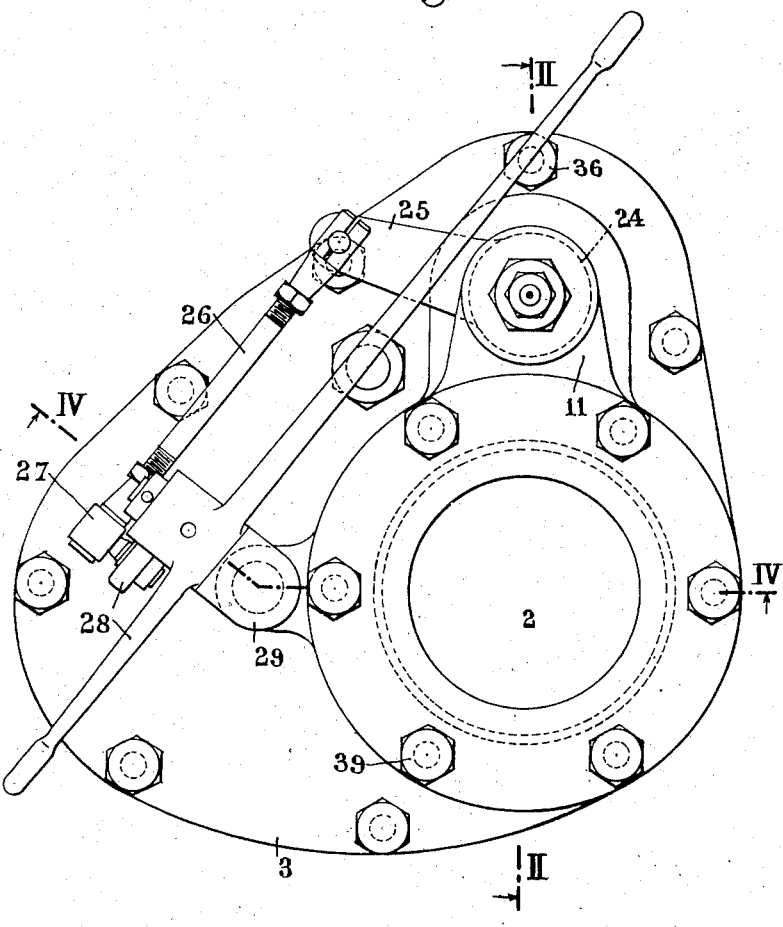
Figure 1 is an elevational view of the valve device showing the exhaust side thereof.
Figure 4:
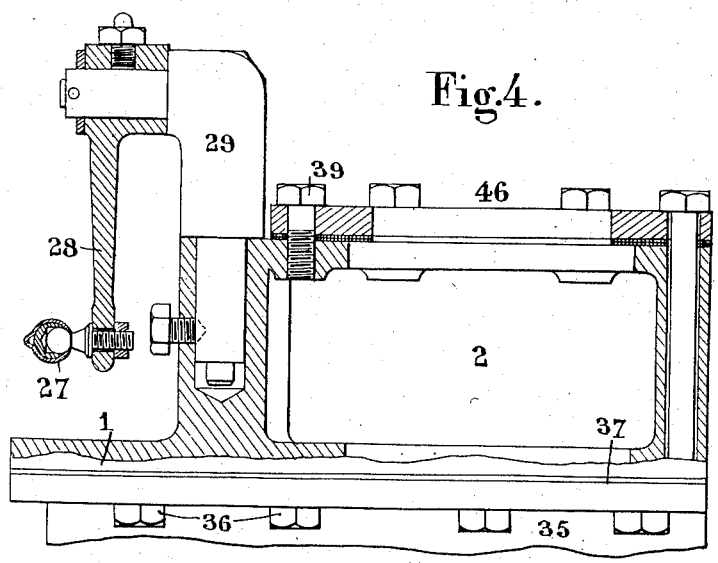
Figure 4 is a cross-section taken upon the broken line IV—IV of Fig. 1.

The valve body 1 may consist of a casting and comprises a cylindrical chamber 2 formed with an integral end plate 3 having an aperture 4 through which the main chamber 2 communicates with an annular, smaller auxiliary chamber 5 disposed on the outer periphery of the main chamber 2 and formed with a substantially cylindrical wall 6 projecting from the aforesaid plate 3; this auxiliary chamber 5 has a lateral wall 9 in which a circular row of peripheral ports 34 are formed, and a bottom wall 8 projecting somewhat from the outer face of the aforesaid plate 3; an accurately dimensioned or calibrated bore 13 is formed in this wall 8. Threaded holes (Fig. 4) are provided on the edge of the main chamber 2 for engagement by bolts 39 when the valve device is mounted on the flange of an exhaust pipe (not shown).

The body 1 is assembled with a case 35 receiving the valve member device by means of bolts 36, a suitable gasket 37 being interposed as usual therebetween for sealing the joint.

Threaded holes are also provided in the case 35 to enable it to be fastened to the flanged end of an inlet pipe (not shown) by means of bolts or the like.

Figure 2:
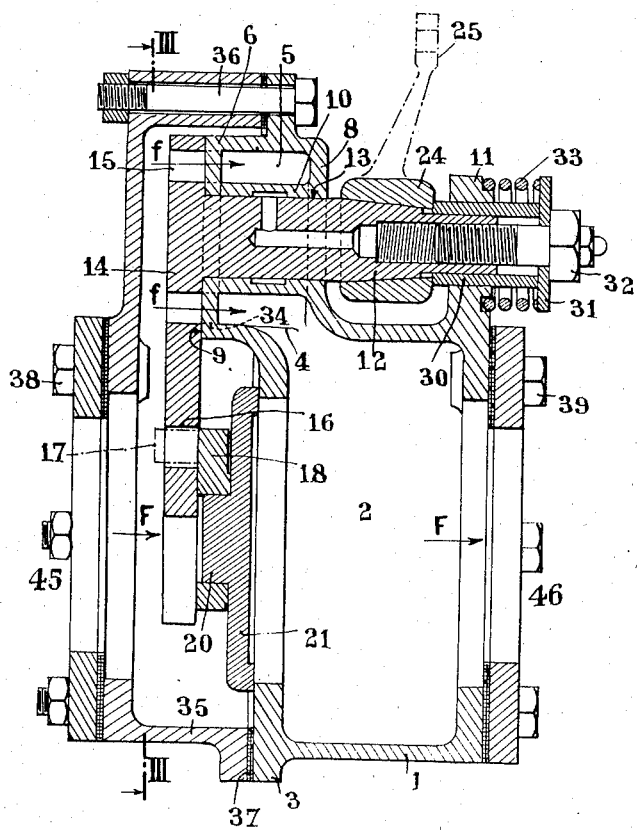
Figure 2 is a vertical section taken upon the line II—II of Fig. 1.
Figure 7:
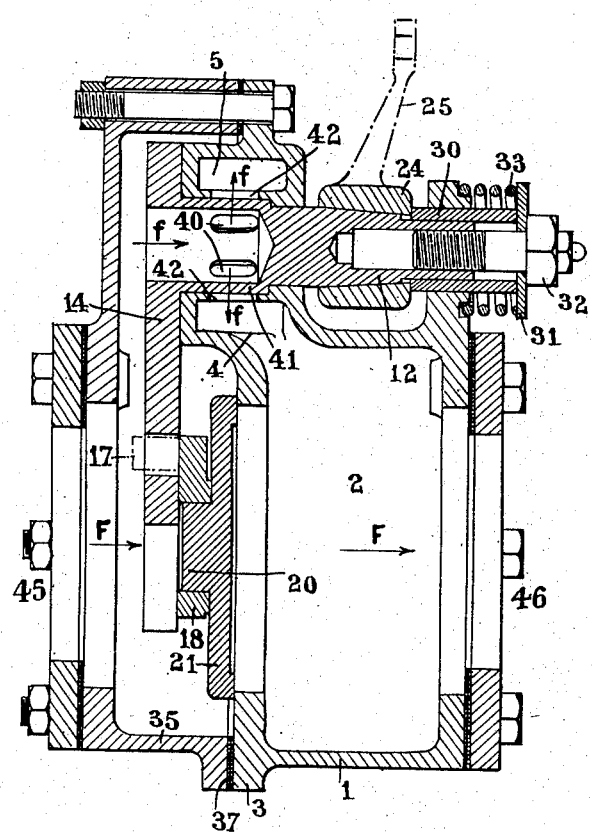
Figure 7 is a view similar to Fig. 2 showing an alternate embodiment.

Figures 2 and 7 of the drawings indicate the circuit followed by the fluid under high-output conditions from the inlet side 45 of the exhaust side 46; this circuit is designated by the arrows F; the by-pass circuit is indicated by the arrows f.

In a bore formed in a lug 11 projecting from the body 1 there is mounted a shaft 12 having a substantially frusto-conical portion and extending through the calibrated bore 13 formed through the wall 10 of the auxiliary chamber 5; the inner end of this shaft 12 is rigidly connected to, or forms an integral part of, a disc 14 having formed therein a plurality of spaced ports 15 positioned at equal radial distances from the centre of the shaft 12; the disc 14 is urged against the registering face of the wall 9 of chamber 5, as will be explained presently. This disc 14 is also formed with an integral lower plate extension 16 constituting a slide having an L-shaped slot slidably engaged by a pin 17 fast with an arm 18 pivoted on the one hand at 19 on a pin rigid with the plate 3 and on the other hand on the hub-forming projection 20 of the main valve member 21.

Figure 3:
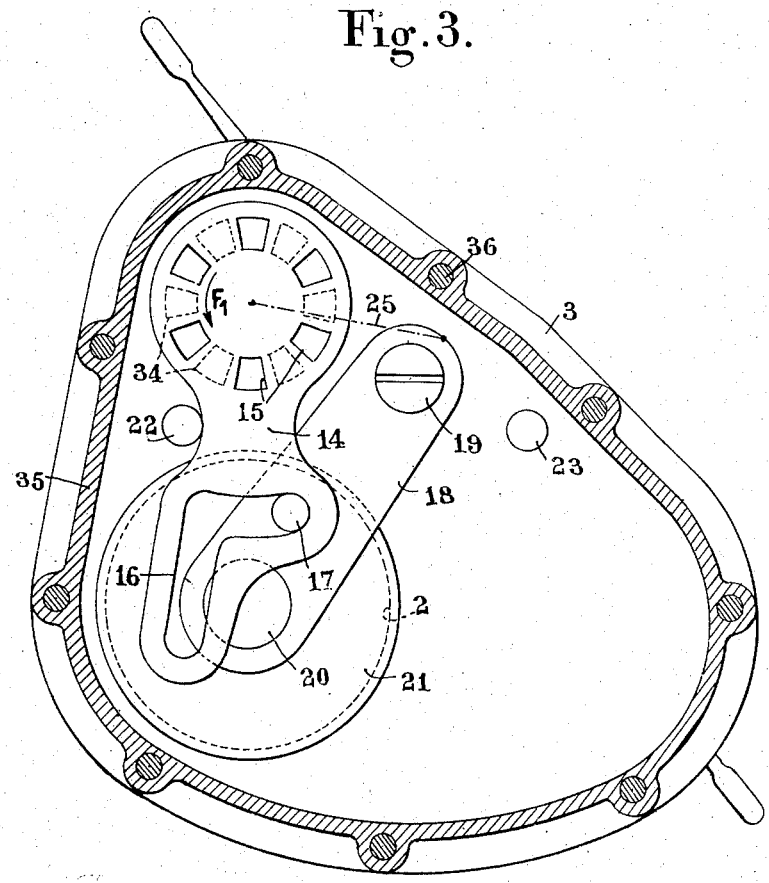
Figure 3 is a cross-section taken upon the line III—III of Fig. 2 and showing the fluid inlet side of the gate valve.

Stop members 22, 23 are provided on the plate 3 to limit the movements of members 14 and 18 (see Fig. 3).

The frustoconical portion of the shaft 12 has wedged thereon the larger boss or hub 24 of a control lever 25 connected through an adjustable rod 26 to a ball-and-socket coupling device 27 of a linkage system 28 pivoted on a bracket 29 rigid with the plate 3.

On the other hand the shaft 12 has threaded thereon a cylindrical outer sleeve 30 engaging with its inner end the boss 24 and with its outer end a washer 31 locked in position by a nut 32; a coil spring 33 is placed between the lug 11 and the washer 31 and urges the latter away from the former so as to keep the disc 14 in fluid-tight engagement with the registering and cooperative face of the wall 9 of chamber 5.

Figure 5:
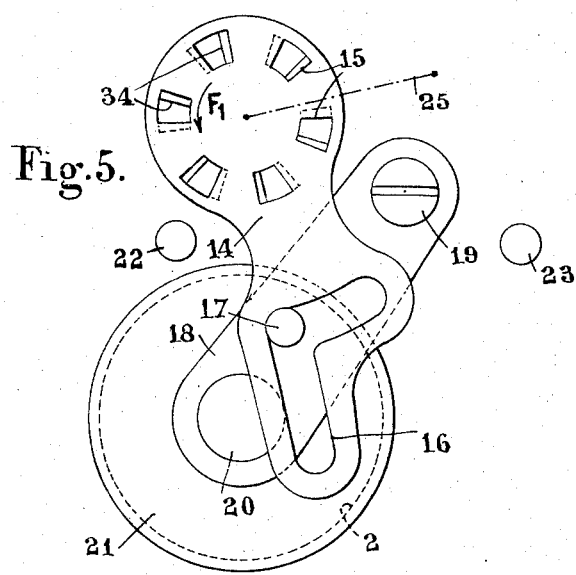
Figure 5 is a fragmentary elevational view showing the auxiliary valve member before the main valve member is actuated.

The device described hereinabove operates as follows:

Assuming the main valve member 21 to be closed (Fig. 3) when the operator actuates the lever 25 through the linkage system 28 this causes the shaft 12 to rotate in the direction of the arrow $F_1$; consequently, the disc 14 will also rotate and bring the ports 15 therein in alignment with the ports 34 formed in the wall of the auxiliary chamber (Fig. 5); thus, the fluid under pressure will firstly flow through the auxiliary chamber 5, thereby discharging inasmuch the main valve member 21; the slot 16 is so designed that the pin 17 driving the arm 18 is positioned as shown in Fig. 5 under the conditions thus obtained.

Figure 6:
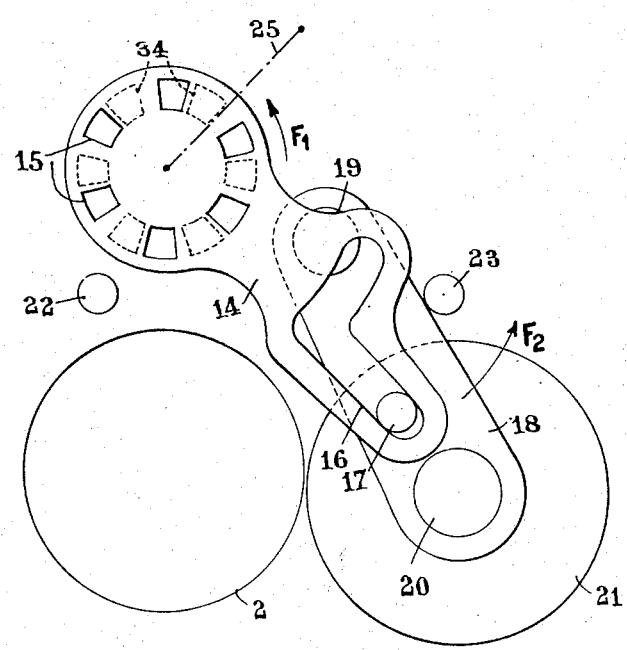
Figure 6 is a similar view showing the main valve member in its open position.

As the lever 25 is further actuated this pin 17 engages the upper portion of the slot 16, as shown in Fig. 5; this upper portion is a curve concentrical with the disc 14 and ports 15, so that the arm 18 will be driven in the direction of the arrow F₂ and the main valve member 21 will be opened until the arm 18 engages the stop 23 (Fig. 6).

When the lever 25 is actuated in the opposite direction the reverse movements are observed, i. e. the main valve member 21 is closed completely and then the fluid is kept flowing through the aligned or registering ports 15, 34 of the auxiliary by-pass forming chamber 5; and finally, as the disc 14 is driven back to the position of Fig. 3, the ports 15 and 34 are re-closed.

Therefore, the main valve member is discharged from the pressure exerted thereagainst by the fluid by simply providing a temporary by-pass controlled through the shaft of the control lever.

According to a modified embodiment shown in Fig. 7, the ports instead of being provided in the wall of the auxiliary chamber 5 and in the disc 14 rigid with the control shaft may be formed on the one hand at 40 in the wall of a cylindrical body 41 rigid with the control lever 25 and rotating in sealing engagement in a seat or bearing consisting of the calibrated bore 13 of the auxiliary chamber 5, and on the other hand at 42 in the annular wall of chamber 5, in alignment with the ports 40 of body 41; in this arrangement the port-carrying body 41 is rigid with the shaft 12 of the slot-carrying plate 16 controlling the arm 18 of the main valve member.

Although the above description refers to a detailed embodiment and a modification of this invention, it will be readily understood that many other modifications may be contemplated without departing from the spirit and scope of the invention, as set forth in the appended claims. Thus, the proportions and relative dispositions of parts shown and described herein should not be construed as limiting the invention as these are given by way of example only.

What we claim is:

1. In a valve, a valve casing having an inlet passage, means defining a main chamber provided with an outlet passage and an auxiliary chamber disposed radially of the main chamber and in communication therewith, said means defining said chambers comprising a partition wall separating the main and auxiliary chambers from the inlet and having a main passageway providing communication between the inlet passage and the main chamber, a displaceable main valve member for selectively opening and closing the main passage thereby to isolate the main chamber from the valve inlet when the main passage is closed by said main valve member, means providing a by-pass for by-passing the main valve member and substantially equalizing pressure on opposite sides of said main valve member prior to opening and closing the main passage comprising, a rotatively operable auxiliary valve member for operating and displacing the main valve member between an operative position for opening the main passage and an operative position for closing the main passage, means operably connecting the auxiliary valve member and the main valve member, said means defining the auxiliary chamber defining a plurality of spaced orifices in communication with the auxiliary chamber, the auxiliary valve member having a plurality of spaced apertures equal in number with said orifices, said auxiliary valve member for operating the main valve member being positioned to open and close the orifices and operable between a first operative position closing the orifices and a second operative position wherein the apertures register with the orifices thereby to provide communication between the inlet and the auxiliary chamber, said third mentioned means cooperating with the auxiliary valve member to initiate the movement of said main valve member away from said main passage when the auxiliary valve member is rotated in a direction toward its second operative position and the apertures and orifices are disposed in a partially registering position and to complete the displacement of said main valve member to its operative position for opening the main passage substantially when said auxiliary valve member is in its second operative position, said third mentioned means being operable to cause the main valve member to close the main passage prior to it fully closing the orifices when rotated in the opposite direction, and means comprising a lever disposed externally of the valve casing for selectively operating the auxiliary valve member between its first and second operative positions thereby to selectively open and close the main passage and so open and close the valve.

2. In a valve, a valve casing having an inlet passage, means defining a main chamber provided with an outlet passage and an auxiliary chamber disposed radially of the main chamber and in communication therewith, said means defining said chambers comprising a partition wall separating the main and auxiliary chambers from the inlet and having a main passageway providing communication between the inlet passage and the main chamber, a displaceable main valve member for selectively opening and closing the main passage thereby to isolate the main chamber from the valve inlet when the main passage is closed by said main valve member, means providing a by-pass for by-passing the main valve member and substantially equalizing pressure on opposite sides of said main valve member prior to opening and closing the main passage comprising, a rotatively operable auxiliary valve member, for operating the main valve member, means operably connecting the auxiliary and main valve members, a valve stem connected to the auxiliary valve member for operating and displacing the main valve member between an operative position for opening the main passage and an operative position for closing the main passage, said means defining the auxiliary chamber defining a plurality of spaced orifices in communication with the auxiliary chamber, the auxiliary valve member having a plurality of spaced apertures equal in number with said orifices, said auxiliary valve member for operating the main valve member being positioned to open and close the orifices and operable between a first operative position closing the orifices and a second operative position wherein the apertures register with the orifices thereby to provide communication between the inlet and the auxiliary chamber, said third mentioned means cooperating with the auxiliary valve member to initiate the movement of said main valve member away from said main passage when the auxiliary valve member is rotated in a direction toward its second operative position and the apertures and orifices are disposed in a partially registering position and to complete the displacement of said main valve member to its operative position for opening the main passage substantially when said auxiliary valve member is in its second operative position, said third mentioned means being operable to cause the main valve member to close the main passage prior to it fully closing the orifices when rotated in the opposite direction, means comprising a lever disposed externally of the valve casing for selectively operating the auxiliary valve member between its first and second operative positions thereby to selectively open and close the main passage and so open and close the valve, said valve stem extending through said auxiliary chamber and having a bore at one end thereof extending axially through a portion of said stem and in communication with said valve inlet and said portion of the valve stem having said axial bore being provided with said apertures disposed to provide communication between the inlet and said auxiliary chamber through said bore when the stem is in its second operative position.

3. In a valve, a valve casing having an inlet passage, means defining a main chamber provided with an outlet passage and an auxiliary chamber disposed radially of the main chamber and in communication therewith, said means defining said chambers comprising a partition wall separating the main and auxiliary chambers from the inlet and having a main passageway providing communication between the inlet passage and the main chamber, a displaceable main valve member comprising a first disk for selectively opening and closing the main passage thereby to isolate the main chamber from the valve inlet when the main passage is closed by said main valve member, means providing a by-pass for by-passing the main valve member and substantially equalizing pressure on opposite sides of said main valve member prior to opening and closing the main passage comprising a rotatively operable auxiliary valve member consisting of a second disk operably connected to the first disk for operating and displacing the main disk valve member between an operative position for opening the main passage and an operative position for closing the main passage, means operably connecting said first and second disks, said means defining the auxiliary chamber defining a plurality of spaced orifices in communication with the auxiliary chamber, the auxiliary disk valve member having a plurality of spaced apertures equal in number with said orifices, said auxiliary disk valve member for operating the main valve member being positioned to open and close the orifices and operable between a first operative position closing the orifices and a second operative position wherein the apertures register with the orifices thereby to provide communication between the inlet and the auxiliary chamber, said third mentioned means cooperating with the auxiliary disk valve member to initiate the movement of said main disk valve member away from said main passage when the auxiliary disk valve member is rotated in a given direction and the apertures and orifices are disposed in a partially registering position and to complete the displacement of said main disk valve member to its operative position for opening the main passage substantially when said auxiliary disk valve member is in its second operative position, said third mentioned means being operable to cause the main disk to close the main passage prior to it fully closing the orifices when rotated in the opposite direction, and means comprising a lever disposed externally of the valve casing for selectively operating the auxiliary valve member between its first and second operative positions thereby to selectively open and close the main passage and so open and close the valve.

References Cited in the file of this patent
UNITED STATES PATENTS

| | | |
|---|---|---|
| 2,090,896 | Oetiker | Aug. 24, 1937 |
| 2,297,797 | Oetiker | Oct. 6, 1942 |

FOREIGN PATENTS

| | | |
|---|---|---|
| 472,430 | Great Britain | Sept. 23, 1937 |